United States Patent
Yap et al.

(10) Patent No.: US 10,691,664 B1
(45) Date of Patent: Jun. 23, 2020

(54) USER INTERFACE STRUCTURAL CLUSTERING AND ANALYSIS

(71) Applicant: FullStory, Inc., Atlanta, GA (US)

(72) Inventors: Jaime Michael Yap, Atlanta, GA (US); Joel Grayson Webber, Decatur, GA (US); Hollis Bruce Johnson, Jr., Atlanta, GA (US); Andrew Scott Blum, Atlanta, GA (US)

(73) Assignee: FullStory, Inc., Atlanta, GA (US)

( * ) Notice: Subject to any disclaimer, the term of this patent is extended or adjusted under 35 U.S.C. 154(b) by 291 days.

(21) Appl. No.: 15/896,167

(22) Filed: Feb. 14, 2018

Related U.S. Application Data

(60) Provisional application No. 62/534,036, filed on Jul. 18, 2017.

(51) Int. Cl.
*G06F 17/30* (2006.01)
*G06F 16/23* (2019.01)
*G06F 3/0484* (2013.01)

(52) U.S. Cl.
CPC ............ *G06F 16/23* (2019.01); *G06F 3/0484* (2013.01)

(58) Field of Classification Search
CPC ................................ G06F 16/23; G06F 3/0484
See application file for complete search history.

(56) References Cited

U.S. PATENT DOCUMENTS

| | | | | |
|---|---|---|---|---|
| 9,495,383 | B2 * | 11/2016 | Mishra | G06Q 50/01 |
| 2012/0158492 | A1 * | 6/2012 | Ye | G06Q 30/0241 |
| | | | | 705/14.49 |
| 2015/0293746 | A1 * | 10/2015 | Tsern | G06F 3/1415 |
| | | | | 715/728 |
| 2017/0212650 | A1 * | 7/2017 | Sinyagin | G06F 3/0484 |
| 2018/0203674 | A1 * | 7/2018 | Dayanandan | G06F 8/38 |
| 2019/0138194 | A1 * | 5/2019 | Ryan | G06F 3/0484 |
| 2019/0171283 | A1 * | 6/2019 | Dey | G06F 3/04895 |
| 2019/0311301 | A1 * | 10/2019 | Pyati | G06Q 30/0631 |

* cited by examiner

*Primary Examiner* — Syed H Hasan
(74) *Attorney, Agent, or Firm* — Fish & Richardson P.C.

(57) ABSTRACT

Methods, systems, and apparatus, including computer programs encoded on a computer storage medium, for clustering user interface event data for analysis and retrieval are disclosed. In one aspect, a system includes a data store and computer(s) that interact with the data store and execute instructions that cause the computer(s) to receive, for a user interface event, event data specifying a structure of a user interface presented during the user session. The event is assigned to a respective cluster based on a comparison of the structure of the user interface specified by the event data to a user interface structure that represents the respective cluster. For each cluster, a user interface attribute indicative of a user interface state of user interfaces specified by the event data in the cluster is determined. User interface state groups are generated based on the user interface attribute for each cluster.

20 Claims, 5 Drawing Sheets

USER INTERFACE STRUCTURAL CLUSTERING AND ANALYSIS

CROSS REFERENCE TO RELATED APPLICATIONS

This application claims the benefit under 35 U.S.C. § 119(e) of U.S. Provisional Patent Application No. 62/534,036, entitled "CAPTURING AND PROCESSING INTERACTIONS WITH A USER INTERFACE OF A NATIVE APPLICATION," filed Jul. 18, 2017. The disclosure of the foregoing application is incorporated herein by reference in its entirety for all purposes.

BACKGROUND

This specification relates to data processing and structural clustering of user interface event data for analysis and retrieval.

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls). User satisfaction with a given website or application can depend on the user's experience interacting with the various user interfaces of the website or application.

SUMMARY

In general, one innovative aspect of the subject matter described in this specification can be embodied in systems that include a data store and one or more computers that interact with the data store and execute instructions that cause the one or more computers to perform operations including, for each of a plurality of different user sessions, receiving, for a user interface event, event data specifying a structure of a user interface presented during the user session, and assigning the event to a respective cluster based on a comparison of the structure of the user interface specified by the event data to a user interface structure that represents the respective cluster. The computer(s) can store the event data with a reference to the cluster to which the event has been assigned. The computer(s) can determine, for each cluster, a user interface attribute indicative of a user interface state of user interfaces specified by the event data in the cluster. The computer(s) can generate user interface state groups based on the user interface attribute for each cluster. Each user interface state group includes clusters that have a matching user interface attribute. The computer(s) can receive, from a requesting device, a request for data related to a given user interface state having a given user interface attribute. The computer(s) can identify a given page state group for which the common user interface attribute matches the given user interface attribute. In response to the received request, the computer(s) can provide, to the requesting device, data for events that are (i) assigned to a cluster in the given user interface state group and (ii) responsive to the request. Other embodiments of this aspect include corresponding methods, apparatus, and computer programs, configured to perform the actions of the methods, encoded on computer storage devices.

These and other embodiments can each optionally include one or more of the following features. Generating the user interface state groups can include identifying, for each pair of clusters, a measure of similarity between the user interface attributes for the pair of clusters and assigning pairs of clusters for which the measure of similarity satisfies a threshold to a same user interface state group.

In some aspects, the user interface attribute for each cluster includes a Universal Resource Locator (URL) pattern generated based on a respective URL for the user interface of each event assigned to the group. The operations can include generating the URL for each cluster by identifying, for the cluster, one or more first URL portions for which a number of URLs of the events assigned to the cluster that include the first URL portion satisfies a condition, identifying, for the cluster, one or more second URL portions for which a number of URLs of the events assigned to the cluster that include the second URL portion does not satisfy the condition, and generating the URL pattern for the cluster by including, in the URL pattern for the cluster, each of the one or more first URL portions and at least one of (i) a wildcard for each of the one or more second URL portions or (ii) a set of values that include at least a portion of the second URL portion of one or more of the second URL portions.

In some aspects, the user interface attribute for each cluster includes a title for the cluster that is generated for the cluster based on a respective title for the user interface of each event assigned to the cluster.

In some aspects, assigning the event to a respective cluster based on a comparison of the structure of the user interface specified by the event data to a user interface structure that represents the respective cluster can include identifying, for each node of a document used to generate the user interface specified by the event data, one or more features of the node, and generating a hash of each feature for each node. For each of a multitude of clusters, a similarity score that represents a similarity between the structure of the user interface specified by the event data and the user interface structure that represents the cluster can be determined based on the hash for each feature of each node and a set of hashes for the user interface structure that represents the cluster. The event data can be assigned to the respective cluster in response to the similarity score for the respective cluster being greater than the similarity score for each other cluster.

In some aspects, assigning the event to a respective cluster based on a comparison of the structure of the user interface specified by the event data to a user interface structure that represents the respective cluster can include determining, for each existing cluster, a measure of similarity between the structure of the user interface specified by the event data and the existing cluster, determining that none of the similarity scores meet a threshold similarity score, and, in response to determining that none of the similarity scores meet the threshold similarity score, generating the respective cluster for the event data.

Some aspects include adjusting the threshold similarity score with an increase in a number of existing clusters. The provided event data can include at least one of (i) data identifying one or more user interface states from which a transition to user interfaces having the given user interface attribute occurred or (ii) data identifying one or more user interface states to which a transition from user interfaces having the given user interface state attribute occurred. The request can specify a frequency of URLs and the provided event data can include a frequency of each URL included in the event data assigned to the clusters in the given user interface state group.

Particular embodiments of the subject matter described in this specification can be implemented so as to realize one or more of the following advantages. User interactions with a user interface can be determined and evaluated without negatively impacting the user experience. Evaluation of the user interface can be used to modify the user interface to provide a better user experience. Evaluation of user interactions with a user interface can reveal difficulties that users have interacting with the user interface.

Data regarding user interface state groups can be used to reveal difficulties users have with a user interface that presents the same (or similar) types of data for different entities, e.g., different users or different products, but that may have different structures and/or different resource locators (e.g., different Universal Resource Locators (URLs)) based on the entity or based on interactions with the user interface. Aggregate statistics for a user interface state group can reveal the most common structure of a user interface, the flow of users between various user interface states, and common difficulties that users encounter when interacting with the user interface represented by the group. Clustering event data based on the structure of the user interface for which the event data was received and grouping the clusters based on user interface attribute(s), e.g., based on common URL patterns, results in groups of clusters for a same logical user interface state, e.g., clusters for a social networking news feed page, that can have different structures. Without clustering based on structure, groups of event data for user interfaces having a similar URL may represent completely different user interface states, resulting in inaccurate statistics that would be useless to a publisher. Thus, clustering based on user interface structure and grouping based on user interface attribute(s) allows for more accurate identification of data for logical user interface states, which allows for more accurate data (e.g., aggregate statistics) for the logical user interface states.

By storing event data with a reference to contextual data (e.g., geographic location of a user device, user device type, etc.) and grouping event data based on user interface states, a search system can provide responsive data for user interface states in response to queries that include various user-generated criteria or search terms. For example, the search system can provide data such as the frequency at which users from a particular geographic area transitioned to a second user interface state when currently viewing a first user interface state. This allows for richer user interface data that can be used by publishers to improve their user interfaces.

The clustering techniques described throughout this document enable real-time clustering as event data is received so that the most up to date information is available to be searched and evaluated. The clustering techniques also enable user interfaces to be clustered based on common structures, and then for the computer system to generalize commonalities between URLs that have the same structure. For example, the computer system can generate a set of rules that can be used to identify a group of user interfaces (e.g., DOM states) that are similar based on commonalities between the URLs for these user interfaces. URL matching alone will not reveal the underlying structural similarities that the techniques described herein reveal, for example, because the structure of a particular page (e.g., having a single URL) can vary based on user interactions with the particular page. However, once user interfaces are clustered according to structure, the commonalities between the URLs (or other features of the user interfaces) can be learned by the system to enable URL pattern rules that correspond to various user interface states. In the absence the clustering and grouping techniques described herein, there are no ways to accurately refer to a page as a state.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
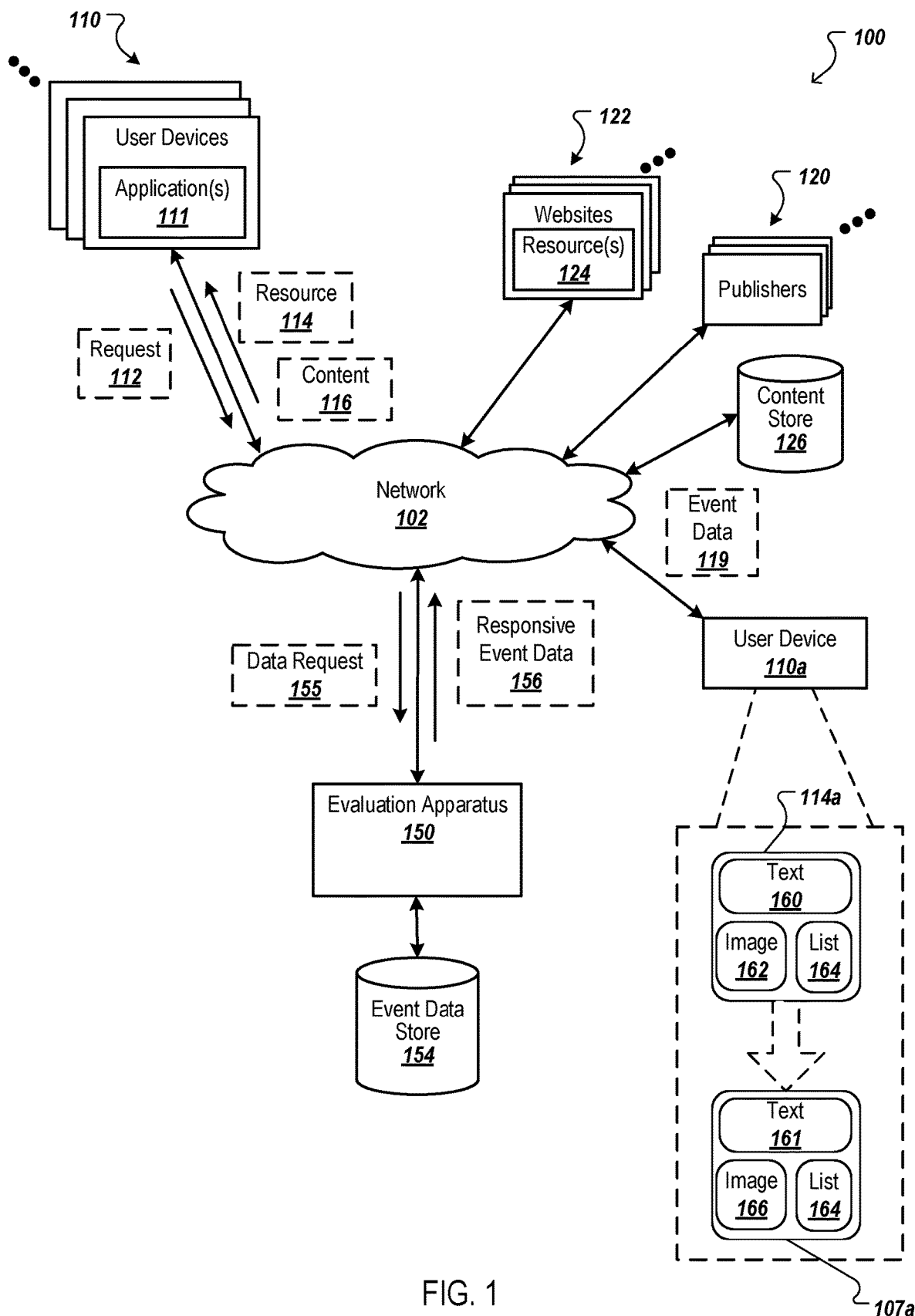
FIG. 1 is a block diagram of an example environment in which users interact with user interfaces.

Publishers (e.g., an entity that provides a user interface) generally want to make user interfaces user friendly so that users will have a positive experience. Having information about user interactions with a given user interface (e.g., a web page or an application interface) can help a publisher identify aspects of the user interface that can be changed to improve the user experience. This document discusses obtaining information related to user interactions with a user interface and processing that information to provide a publisher with data that the publisher can use to identify aspects of the user interface that may be modified to contribute to a positive user experience with the user interface. As discussed in detail below, the data provided to the publisher can include session activity data that describe user interactions with the user interface and/or data related to groups of events, e.g., a group of events related to a same or similar user interface state.

In some implementations, a user interface state represented by a group is a logical user interface state. A logical user interface state refers to one or more states of a web page, application page, or other user interface for which the actual content presented in the user interface varies based on the entity for which the user interface is being presented, but the same (or similar) type(s) of data is presented for the different entities (e.g., different users, products, locations, objects, etc.) and in the same (or similar) formats. However, the structure of the user interface for a logical user interface state can vary, for example, based on entity per-user basis and/or based on user interactions with the user interface, or due to custom application logic (e.g., a loading screen or an error state). Thus, a single logical user interface state might be represented by of multiple different structural clusters.

For example, a logical user interface state can be a news feed page of a social networking site. In this example, the user interface for each user's news feed can present the same type of data (e.g., stories, posts, shared pictures, etc.) in a similar format (e.g., a list of stories, posts, etc. with links to other pages or content adjacent to the list). However, the actual stories, posts, shared pictures, links, and other content can differ based on the user that is logged into the social networking site. Thus, if a strict comparison of the content of the user interfaces presented to these two different social network users were performed, there would be very little similarity such that these two user interfaces would not be considered similar. However, evaluating the underlying structure of these user interfaces will reveal a high level of similarity between these user interfaces because of the fact that each of these user interfaces present the same type of data in a similar format, and at similar locations of the display. This structural similarity can be used to cluster or group user interfaces for purposes of evaluating user interaction with user interfaces and/or websites that have similar structure.

As described below, data for user interface states, such as aggregate statistics for events related to a user interface state, can help publishers understand how users are interacting with the user interfaces and to identify difficulties that users are having with the user interfaces. More specifically, the ability to cluster user interface states based on the underlying structure of the user interfaces enables the identification of particular user interface states that lead to user dissatisfaction and/or possibly contribute to error conditions (e.g., directing users to a broken link).

User interface states for a publisher can be identified by generating clusters for event data related to user interfaces that have the same or similar (e.g., at least a threshold similarity) structure. The structure of a user interface can be based on a document object model (DOM) of a resource, e.g., a web page. The structure of a user interface of a native application can be based on view trees (and other data) used by the application to generate the user interfaces. The structure of a user interface may be independent of the actual content presented by the user interface. For example, text, visual characteristics of images, content of graphs, etc. presented by a user interface may not be used to determine the structure of the user interface.

A user interface attribute can be determined for each cluster of event data. The user interface attribute can be indicative of the user interface state for which the event data in the cluster was received. As described below, an example of a user interface attribute is a generalized URL pattern generated based on the URLs for the event data in the cluster. another example user interface attribute for a cluster is a title (or a portion of a title) that at least a portion of the user interfaces share.

The clusters of event data can be grouped based on the user interface attributes for the clusters. For example, clusters that have the same user interface attribute can be grouped together. In a particular example, each group can represent a particular logical user interface state and include the clusters that have a same or similar URL pattern. In another example, the clusters can be grouped based on titles, occurrences of events (e.g., presentation of an error dialog), or other appropriate characteristics.

The clusters and groups of clusters can be used to provide data related to logical user interface states, user interface states for which particular events occurred, user interfaces having a particular structure (e.g., a particular DOM structure), user interface states having a particular URL or URL portion (e.g., a keyword in the URL), and/or other appropriate criteria. For example, the clusters can be used to provide aggregated statistics related to the number of users that transitioned from a user interface having a first structure to a user interface that has a second structure different from the first structure. Similarly, the logical user interface state groups can be used to provide a distribution of the URLs for the logical user interface state and/or the distribution of different structures in which the logical user interface state been presented.

FIG. 1 is a block diagram of an example environment 100 in which users interact with user interfaces. The example environment 100 includes a network 102, such as a local area network (LAN), a wide area network (WAN), the Internet, or a combination thereof. The network 102 connects user devices 110, publishers 120, websites 122, and an evaluation apparatus 150. The example environment 100 may include many different user devices 110, publishers 120, and websites 122.

A website 122 is one or more resources 124 associated with a domain name and hosted by one or more servers. An example website is a collection of web pages formatted in hypertext markup language (HTML) that can contain text, images, multimedia content, and programming elements, such as scripts. Each website 122 is maintained by a publisher 120, which is an entity that controls, manages and/or owns the website 122.

A resource 124 is any data that can be provided over the network 102. A resource 124 is identified by a resource address that is associated with the resource 124. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). A user device 110 is an electronic device that is capable of requesting and receiving resources over the network 102. Example user devices 110 include personal computers, mobile communication devices, and other devices that can send and receive data over the network 102. A user device 110 typically includes a user application 111, such as a web browser, to facilitate the sending and receiving of data over the network 102. The user device 110 can also include other user applications 111, such as native applications developed for a particular platform or a particular device. Publishers 120 can develop and provide the native applications to the user devices 110.

A user device 110 can submit a resource request 112 that requests a resource 114 from a website 122. In turn, data representing the requested resource 114 can be provided to the user device 110 for presentation by the user device 110. The requested resource 114 can be, for example, a home page of a website 122, a web page from a social network, or another resource 124. The data representing the requested resource 114 can include data that cause presentation of content 116 (e.g., embedded content such as text that is included in the code of the resource) at the user device 110. The data representing the requested resource 114 can also include instructions that cause the user device 110 to request remote content from a content store 126. The remote content can include, for example, images, content that is updated periodically, content used across multiple different resources, or content provided by third parties (e.g., other than the publisher). Thus, the remote content can be updated or changed without having to update the resource code.

The environment 100 includes an evaluation apparatus 150 that facilitates acquisition of event data 119 from the user devices 110. As used throughout this document, the phrase event data refers to data obtained from a user device 110 during a user session. The event data can include, for example interface data, user interaction data, and mutation data. The interface data specify a structure of a user interface that is presented at a user device during the session. For example, when the user device 110a renders the resource 114a, the interface data can be an initial document object model (DOM) of the resource 114a that is first presented at a user device. In this example, the DOM would specify that the resource 114a initially presented text 160, an image 162, and a list of links 164 and include contextual data about each of these elements (e.g., text of each element, location of each element, visual characteristics of each element, etc.). The DOM can be provided to the evaluation apparatus 150 once the resource 114a is completely rendered by the user device 110a.

Additionally, or alternatively, the DOM can be reconstituted based on mutation data that are provided to the evaluation apparatus 150 as the resource 114a is rendered by the user device 110a. For example, the mutation data can specify each element that is rendered by the user device, and the mutation data can be provided to the evaluation apparatus 150 (e.g., either sequentially or in sets of mutation data that were accumulated over a specified time by the user device). Using the mutation data, the evaluation apparatus 150 can reconstitute the DOM in a manner similar to that performed by a browser. The mutation data can be obtained, for example, by inserting a mutation observer script in the code of the resource (or native application). The mutation of observer script can monitor the resource for changes to the structure of the resource, record mutation data representing the changes in local memory at the user device, and provide the mutation data to a specified location (e.g., the evaluation apparatus 150).

The user interaction data specify user interactions at the user device, and include user interactions with the elements of the user interface. The user interaction data can specify mouse movements, user clicks, mouse hovers, highlights, text inputs, and any other user interactions that are performed at the user device. For example, assume that a user clicks on an item in the list 164, in this example, the user interaction data will specify that a user click occurred and identify the element of the user interface that was clicked. The user interaction data can also include timestamp information and/or sequential numbering information specifying when each user interaction occurred so that the user interaction data can be coordinated with other data. For example, the user interaction data can specify an absolute time at which a given user interaction occurred and/or a number representing when a given user interaction occurred relative to other user interactions a set of user interactions (e.g., user interaction 50 out of 150 total user interactions).

The user interaction data can be obtained, for example, by inserting an interaction tracking script in the code of the resource (or native application). The interaction tracking script will monitor mouse movement, clicks, and other user actions. In the context of a tablet or other touchscreen device, the interaction tracking script monitor user taps, swipes, pinches, and other user interactions with the touchscreen device.

The mutation data specify changes to the structure of the user interface that occur during a user session. For example, assume that a user clicks on an item in the list 164, which causes the image 162 to be replaced by the image 166. In this example, the mutation observer script can detect the removal of image 162 and the addition of the image 166 in the user interface, and stored mutation data at the user device 110a specifying that the image 162 was removed from the user interface and that the image 166 was inserted into the user interface. Alternatively, or additionally, the mutation data can directly specify the replacement of the image 162 by the image 166 (e.g., rather than specifying both the remove mutation and the add mutation). Periodically, the user device 110a can upload (or otherwise transmit) the mutation data to the evaluation apparatus 150.

In some implementations, each user interface element is identified by a number (or a name) corresponding to the order in which the user device rendered the user interface elements. For example, assume that the item from the list 164 that was clicked was the last of 50 elements rendered by the user device when loading the resource 114a. In this example, the mutation data may specify that element 50 was removed from the resource 114a and element 51 (e.g., image 166) was inserted into the resource 114a (e.g., assuming that no other elements were rendered between the rendering of element 50 and the image 166). The mutation data can also include timestamp data, which can be used to correlate the mutation data with other data (e.g., user interaction data). The mutation data can continue to be provided to the evaluation apparatus 150 throughout the user session, such that the mutation data obtained by the evaluation apparatus represents all changes to the user interface over the user session.

In some implementations, the numbering representing the order of user interactions and the numbering representing the order in which the user device rendered the user interface elements are a same numbering sequence. In such implementations, the numbering provides a relative order of both changes to the user interface and user interactions with the user interface. For example, assume that a last page element rendered and given a number of x. Further assume that the next event was a user interaction with the user interface, which led to a subsequent change in the DOM. In this example, the user interaction could be assigned a number x+1 (or some other incremental amount other than 1), and the mutation data corresponding to the change in the DOM could be assigned a number x+2. Thus, the numbering scheme would indicate that the user interaction occurred between the rendering of the last page element and the change in the DOM.

As used throughout this document a user session is a period of user interaction with a user interface. In the context of a website, the user session can begin when a user requests a first resource from a given domain (e.g., example.com) and can end when a session end condition is met. In the context of a native application the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 110 for some time (e.g., until the user reopens the browser or again launches the native application) prior to the user device 110 submitting the session end message to the evaluation apparatus 150.

The evaluation apparatus 150 receives the event data 119 from the user device and stores the event data 119 in an event data store 154. As discussed in more detail with reference to FIG. 2, the evaluation apparatus 150 can assign event data to clusters based on the structure of the user interface for the event and group the clusters based on one or more rules and/or criteria, e.g., based on a user interface attribute of user interfaces for event data assigned to the clusters.

The evaluation apparatus 150 can also provide responsive event data 156 in response to data requests 155, e.g., received from publishers 120. For example, a publisher 120 can submit a data request 155 that specifies a user interface attribute for a user interface state group and/or data specifying the type of event data requested. In this example, the user interface attribute can be a portion of a URL (e.g., a URL path component) and the type of event data can be most common structure for the user interface state.

The data request 155 can be generated in response to selection of a link or a query that includes the user interface attribute and/or the type of event data. For example, the evaluation apparatus 150 can present a dashboard user interface for a publisher 120 that presents a list of user interface states of the publisher's user interfaces. The publisher 120 can select a particular user interface state and, in response, the evaluation apparatus 150 can present data related to the user interface state, e.g., aggregate statistics for the user interface state. The aggregate statistics can include the number of different structures for the user interface state, the user interface attribute for the user interface state, the number of and/or distribution of different resource locators (e.g., URLs) for the user interface state, and/or other appropriate data. The evaluation apparatus 150 can also present links to additional data. For example, the evaluation apparatus 150 can present, for each cluster in the group, a link that allows the user to request and view additional data for the cluster. When a link is selected, the publisher's computer can submit a data request 155 for the resource linked to by the link.

Clustering event data based on user interface structure and grouping the clusters of event data based on user interface attributes (e.g., based on URL pattern) allows the evaluation apparatus 150 to identify and provide meaningful data, e.g., aggregate statistics, for logical page states and their respective structural configurations. For example, the clusters can be used to identify the most common structural configuration of a user interface that leads to error pages so that a publisher can evaluate the structure and correct any issues that may be present. The clusters in a user interface group can be used to identify the most common structural configuration of a logical user interface state. For example, if the most common structural configuration of a user interface is an error page, a publisher would want to know this, so that the user interface can be corrected.

Figure 2:
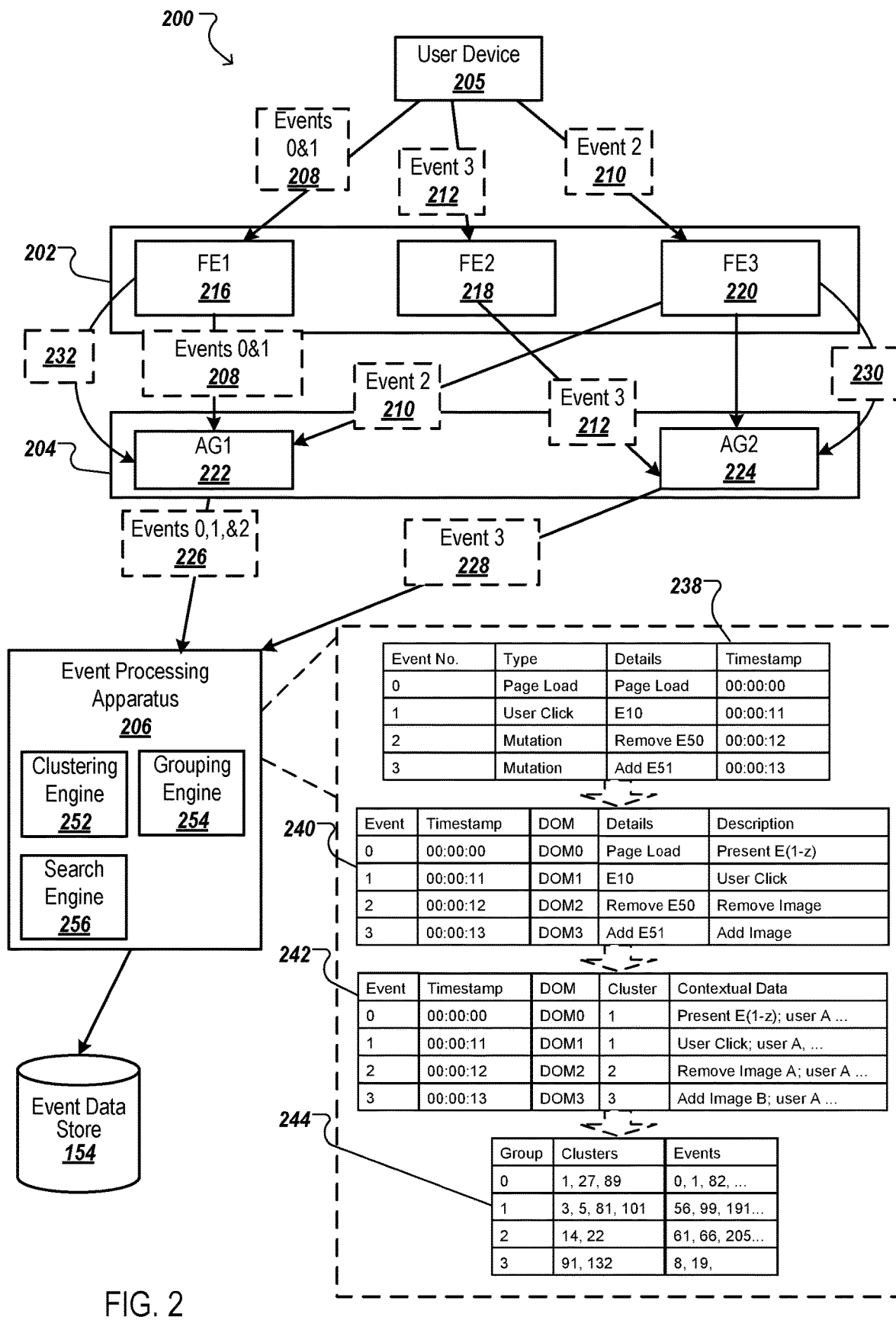
FIG. 2 is an example data flow for grouping clusters of event data for user interface events.

FIG. 2 is an example data flow for grouping clusters of event data for user interface events. The example data flow 200 also shows various elements that can be included in an evaluation apparatus 150 of FIG. 1. For example, the evaluation apparatus 150 can include a set of front end devices 202, a set of aggregators 204, and an event processing apparatus 206. In some implementations, the evaluation apparatus 150 includes only a proper subset (i.e., fewer than all) of the set of front end devices 202, the set of aggregators 204, and the event processing apparatus 206. For example, the evaluation apparatus 150 can include only the event processing apparatus 206, which can receive and process data similar to that provided by the set of aggregators 204.

The data flow 200 can begin with the set of front end devices 202 receiving event data from a user device 205. The set of front end devices 202 can receive different sets of event data 208, 210, 212 from the user device 205 at various points in time. For example, the set of event data 208 can include data representing "event 1" and "event 2" (collectively "events 1&2"), which can be the first two events in a given user session. Similarly, the set of event data 210 can include data representing "event 3" (e.g., the third event that occurred during the given user session), while the set of event data 212 can include data representing "event 4" which may be the fourth event that occurred during the given user session.

In some implementations, the different sets of event data 208, 210, and 212, each include raw event data (e.g., interaction data and/or mutation data that have not yet been processed) for one or more events (e.g., an interaction event and/or a mutation event). An interaction event corresponds to a user interaction with the user interface (e.g., a mouse movement, click, tap on touchscreen, pinch, swipe, etc.) and is represented by interaction data. A mutation event corresponds to a structural change to the user interface (e.g., a DOM change or a change to the user interface structure of a native application) and is represented by mutation data.

The raw event data can be, for example, data captured by the user device using a mutation observer and/or an interaction tracking script. The raw event data (e.g., interaction data) for a user interaction (e.g., a user click of a button) can include data specifying one or more of a session identifier for the user session, a timestamp (e.g., an absolute time indicator and/or a relative time indicator) corresponding to a time at which the user interaction occurred, and/or the user interaction (e.g., the user click) and data specifying the user interface element with which the user interaction occurred (e.g., the button that was clicked).

In some implementations, the user interface element will be identified in the raw event data based on a number that has been assigned to the user interface element.

Continuing with the example above, the raw event data corresponding to the user click of the button can be "ID100 click" indicating that a user click on element 100 was detected. As discussed above, during a given user session, each user interface element can be assigned a number when the user interface element is rendered by the user device. In this example, the ID100 can indicate that the user interface element clicked by the user was the 100th user interface element rendered (or displayed) during the user session. However, the raw event data may not include contextual information regarding the element 100. For example, the raw event data may not specify that the element 100 is a button, a location of the element 100, or any visual characteristics of the element 100 (e.g., text associated with the element 100). As discussed in more detail below, this information can be identified by the event processing apparatus 206 during processing of the raw event data.

The raw event data corresponding to a change to the structure of the user interface (e.g., mutation data) can include data specifying one or more of a session identifier for the user session, a timestamp (e.g., an absolute time indicator and/or a relative time indicator) corresponding to a time at which the structural of the user interface occurred, and/or the structural change to the user interface. For example, during an initial page load, each element of user interface that is rendered can be detected, and the rendering of each element can be considered a separate event (e.g., a series of different add content (or node) mutation events). After the initial page load, each change to the user interface (e.g., content additions, content replacements, content removals, content expansions, text input, color changes, zoom events, page scrolls, cascading style sheet ("CSS") loads, and/or any other changes to the structure of the user interface) can be identified as a separate mutation event. The raw event data (e.g., mutation data) representing each mutation event can specify the user interface mutation (e.g., an element add or removal) and the user interface element(s) involved in the mutation event.

Continuing with the example above, assume that the user click of the user interface element 100 resulted in removal of an image assigned ID200 that was presented in the user interface prior to the user click, and resulted in addition of an image assigned ID300 in the user interface subsequent to the user click. In this example, the raw event data specifying the change to the structure of the user interface can include a mutation event "ID200 remove" and a mutation event "ID300 add" along with contextual information regarding the insertion of the image associated with ID300 in the user interface. The contextual data can include, for example, a location of the image in the user interface, a size of the image, text associated with the image, and/or any other information corresponding to insertion of the image within the user interface. In some implementations, the mutation data for a given mutation event can correspond to a hierarchical tree having a node representing the user interface element associated with the mutation event, sub nodes representing contextual data corresponding to the user interface element, and/or data specifying where the hierarchical tree is located within a larger tree representing the structure of the user interface.

As illustrated by FIG. 2, a single set of event data can include data representing multiple events or a single set event data can include data representing just a single event. For example, the set of event data 208 includes data representing both event 1 and event 2, while the sets of event data 210 and 212 each include data representing only a single event. In some implementations, the scripts that detect mutation events and user interactions record any detected mutation events and user interactions over a specified period, and then transmit any raw event data corresponding to the detected events at the end of the specified period. The specified period may be based on a length of time or an occurrence of a number of the events.

In some implementations, the user device 205 transmits event data to the set of front end devices 202. The set of front end devices 202 can include one or more data processing apparatus (e.g., computers or servers) that collect raw event data from user devices and forward the raw event data to a set of aggregators 204.

The set of front end devices 202 may include multiple front end devices (e.g. 216, 218, and/or 220) to help ensure that a front end device is available to receive event data from a user device (e.g. 205) when the user device is ready to upload the event data for processing. For example, when multiple front end devices 216, 218, and 220 are included in the set of front end devices 202, front end devices 216 and 218 may remain available to accept event data in the event that the front end device 220 goes off-line (e.g., is powered down or is unreachable over a network) or is otherwise unavailable to accept event data from user devices (e.g., due to network latencies, bandwidth restrictions, or availability of processing resources).

In some implementations, the set of front end devices 202 do not process the event data received from the user devices, but rather simply forward the received event data to the set of aggregators 204. Forwarding the event data in this manner helps reduce the likelihood that a user device will be unable to upload event data due to unavailability of a front end device, which can also reduce the storage and/or processing requirements of the user device. The set of aggregators 204 can include one or more data processing apparatus (e.g., computers or servers) that obtain the raw event data from the set of front end devices 202 and prepare the event data for transmission to the event processing apparatus 206. In some implementations, the set of aggregators 204 identify event data that correspond to the same user session and group that data together for transmission to the event processing apparatus 206. For example, aggregator 222 ("AG1") may receive event data 208 and event data 210 from the front end device 216 and the front end device 220, respectively, while aggregator 224 ("AG2") may receive event data 212 from the front end device 218. In this example, the aggregator 222 can group the event data 208 and the event data 210 together in an event group 226 that the aggregator 222 transmits to the event processing apparatus 206 for processing. As noted above, the set of aggregators 204 can group event data for a same user session into an event group that is transmitted to the event processing apparatus 206. In some implementations, this grouping is performed by identifying a session identifier that is included in the event data received from the user device 205 (e.g., by way of the set of front end devices 202).

The event processing apparatus 206 receives the event group 226 and the event group 228 from the aggregator 222 and the aggregator 224, respectively. In some implementations, the event processing apparatus 206 will store event data from received event groups until a session end condition has been met, as discussed above with reference to FIG. 1. When the session and condition has been met, or the event processing apparatus 206 otherwise determines that it is time to process the event data, the event processing apparatus proceeds to cluster and group the event data.

For example, the event processing apparatus 206 can begin by identifying each event from the event data and identifying, from the event data, one or more of the type of event, details regarding the event, and/or timestamp corresponding to the event as illustrated by table 238. In the table 238, the events have been ordered based on the event number, which can specify a relative order in which each of the events occurred. For example, event 1 is the first event that occurred during the user session, and corresponds to an initial page load. For purposes of this example, the initial page load includes (and can reference) each mutation event (e.g., the rendering of each element of the user interface) that occurred during the initial page load.

Meanwhile, event 2 (corresponding to a user click) occurred after event 1, event 3 (corresponding to removal of a user interface element) occurred after event 2, and event 4 (corresponding to insertion of a user interface element) occurred after event 3. Each of these events are listed in ascending order according to their event number. Each of these events also has a corresponding timestamp indicating an absolute time (e.g., GMT) when each of the events occurred.

Using the event data in the table 238, the event processing apparatus 206 can reconstitute the structure of the user interface throughout the user session. For example, using the mutation events corresponding to the page load (e.g., event 0), the event processing apparatus 206 can determine the structure of the user interface that resulted from the initial page load (and at various points during the initial page load).

In some implementations, the initial structure can be reconstituted by reconstituting the initial DOM of the resource in a manner similar to that performed by browsers to render and present the online resource at the user device. With reference to FIG. 2, the initial DOM of the resource is labeled DOM0 in the table 240, and corresponds to the presentation of user interface elements 1-z (e.g., as represented by E(1-z)).

Once the event processing apparatus 206 has reconstituted the initial structure of the user interface ("initial structure"), the event processing apparatus 206 can use that initial structure and subsequent mutation events to reconstitute the user interface structure at other points in the user session. For example, based on the data corresponding to event 2, the event processing apparatus 206 can determine that a next state of the user interface differed from the initial structure based on the event data 210 specifying the removal of user interface element E50. Therefore, the event processing apparatus 206 can create a next instance of the user interface structure by removing portions of the initial structure (e.g., nodes) corresponding to the user interface element E50. This second instance of the user interface structure is labeled DOM1.

The event processing apparatus 206 can continue to reconstitute subsequent states of the user interface by continuing to modify a last determined state of the user interface structure with subsequent event data. For example, the event processing apparatus 206 can modify DOM1 using the event data 212 corresponding to event 3 to obtain DOM2, which is a next state of the user interface structure during the user session. In this example, the event processing apparatus 206 can arrive at the structure of DOM2 by adding one or more nodes representing user interface element E301 to DOM1. Each state of the user interface structure can be reconstituted in a similar manner with additional event data. Each of the reconstituted user interface states (e.g., DOMs) can be stored in a data store, such as the event data store 154.

In the context of a native application (e.g., a mobile application), the processing performed by the event processing apparatus can be performed in a similar manner. However, the event data reported by the native application may have a different format and/or different event identifiers than those used to render an online resource. For example, in the context of a native application, code that performs operations similar to the mutation observer and the interaction tracking script will be included in the code of the native application and will describe changes to the user interface of the native application and user interactions with the user interface of the native application. Because the structure of the native application user interface will likely differ from the structure of a website, the mutation data and/or user interaction data reported by the user device may not match the mutation data and/or user interaction data that are reported for a website or another set of resources. Therefore, the event processing apparatus 206 can utilize an application to resource mapping to reformat (or translate) the event data received from the native application to a format that can be used to reconstitute the various states of the native application in a manner similar to that described above. Example techniques for obtaining event data for native applications and determining the structure of a user interface specified by the event data are described in U.S. Patent Application No. 62/534,036.

The event processing apparatus 206 can also analyze the event data to identify specified events and obtain contextual data related to the events which can be used to provide statistics regarding the context of user interface state groups and/or statistics regarding the user interface states that included a particular context. For example, the event processing apparatus 206 can identify the user click of event 1, and analyze the event data to obtain contextual data related to that user click. In some implementations, the contextual data related to a given event can be identified based, at least in part, on a user interface element that is associated with the event. For example, with reference to the user click of event 2, the interaction data indicates that the user click was a click on user interface element E10. While the user interface element may be identified as element E11) (or ID10) in the interaction data, the interaction data may not include other information that can be used to describe (or provide context about) the user interface element E10.

In some implementations, the event processing apparatus 206 can obtain contextual data corresponding to user interactions from other event data and/or the reconstituted user interface structures that have been stored for the user session. For example, with reference to a given event, the event processing apparatus 206 can determine the state of the user interface structure at the time of the given event and use the state of the user interface structure at that time to obtain contextual data for the given event.

The event processing apparatus 206 can identify the structure of the user interface at the time of a given event, for example, based on the event numbers and/or timestamps corresponding to the given event and a most recent mutation event preceding the given event. For example, with reference again to the user click of event 2, the event processing apparatus 206 can determine, based on the timestamps (or event numbers), that the initial page load was the most recent mutation event prior to the user click. Therefore, the event processing apparatus 206 can identify DOM0 as the structure of the user interface at the time of the user click.

Once the event processing apparatus 206 has identified the structure of the user interface at the time of a given event, the event processing apparatus 206 can use that identified structure to obtain contextual data related to the given event. For example, the event processing apparatus 206 can identify the user interface element E10 in DOM0, and then identify other portions (e.g., nodes) of the DOM0 that provide contextual data about the interface element E10.

For purposes of this example, assume that the DOM0 is formatted as a hierarchical data structure (e.g., a tree) in which each node is hierarchically associated with other related nodes. In this example, the node corresponding to interface element E10 may have a child node identifying the interface element E11) as a "button," and a grandchild node of the interface element E10 may specify that the text "View Next" is presented in the interface element E10. Thus, based on the structure of DOM0, the event processing apparatus 206 can determine that the interface element E10 is a button that includes the text "next image," and store this information as contextual data for the user click of event 2, as illustrated by table 242 (e.g., Button:Text "View Next"). Note that the example above describes obtaining contextual data from child nodes of the user interface element, but contextual data can also be obtained from parent nodes of the user interface element.

Contextual data for an event can also include data related to the user device at which the event occurred. This data can include the type of user device, the geographic location of the user device when the event occurred, and/or data about the user of the user device, e.g., demographic data, if the user has agreed to allow such data to be collected. If user data is used, the user data can be anonymized. Contextual data for an event can also include custom variables or meta-data supplied by the application that can be recorded along with an event.

In some implementations, the event processing apparatus 206 can generate contextual data for events, e.g., when processing received event data. For example, the event processing apparatus 206 can compute or derive measures (e.g., user frustration scores, user engagement scores, and/or churn risk probability) based on the event data. The event processing apparatus 206 can use trained models to determine the measure(s) and associate the measure(s) with the corresponding event data The event processing apparatus 206 includes a clustering engine 252 (which may be implemented in a back-end server) that generates clusters of events (and their respective event data) based on the structure of the user interface at the time of the event. In some implementations, the clustering engine 252 assigns the event data for each event to a cluster as the event data is received. For example, the event data can be received in one or more streams of event data from one or more publishers. For resource that include a DOM structure, the clustering engine 252 can determine the structure of the user interface for each event by reconstituting the DOM structure at the time of the event after receiving the event data. Once the DOM structure has been reconstituted, the clustering engine 252 can assign the event to a cluster based on the reconstituted DOM structure. For native applications, the event processing apparatus 206 can reconstitute the user interface structure, for example, using view trees and/or other data and assign the event to a cluster based on the reconstituted structure. In some implementations, the event processing apparatus 206 assigns events to clusters after a session end condition has been met or periodically based on a specified time period.

Each cluster can have a unique cluster identifier. When the clustering engine 252 assigns event data to a given cluster, the event processing apparatus 206 can assign the cluster identifier of the given cluster to the event data and store the event data with a reference to the cluster identifier, as shown in table 242. As shown in table 242, the event data for each event can be stored with a reference to its event identifier and its cluster identifier.

The clustering engine 252 can assign event data to a cluster based on a comparison of the structure of the user interface for the event data to a user interface structure that represents the cluster. The user interface structure that represents a cluster can be determined based on the structures of user interfaces for the event data assigned to the cluster. The event processing apparatus 206 can determine a general user interface structure for a cluster based on similarities between the structures for the events assigned to the cluster.

In some implementations, the clustering engine 252 determines the user interface structure for a cluster using a set of structural features of the user interface of each event assigned to the cluster. As discussed in more detail below, the set of features can include data for each node of a tree (e.g., nodes of a DOM) of the structure or a hash (or other encoding) of this data. The set of features for each user interface can be in the form of a feature vector. For example, each dimension in the vector can correspond to a particular feature of a user interface, and the value of each dimension can specify whether the user interface has the feature. In this example, the value of a dimension may be a value of one if the user interface has the feature and a value of zero if the user interface does not have the feature.

The clustering engine 252 can determine, as a representation of the user interface structure of a cluster, a set of values for the features based on a weighted average (or other measure of central tendency) of the values for the set of features of user interfaces assigned to the cluster. In this example, the set of values that represents the cluster can include, for each feature, a weighted average of the value of the feature for the user interfaces assigned to the cluster.

In a particular example, the structure of each user interface can be represented by a feature vector that includes, for each feature of the user interface, an encoding (e.g., a hash) that represents the feature. As some user interfaces include features that other user interfaces do not have, some feature vectors will include encodings that other feature vectors do not have. When determining a feature vector that represents the user interface of a cluster, the clustering engine can determine, for each encoding included in at least one of the feature vectors, a value that is representative of the number of user interfaces assigned to the cluster (and that are being used to determine the user interface for the cluster) that have the encoding. For example, a value of one may be used for each user interface that includes the feature (and thus, its feature vector includes the encoding for the feature) and a value of zero may be used for each user interface that does not include the feature (and thus, its feature vector does not include the encoding for the feature). An average can then be determined for each feature. For example, if five feature vectors (one for each of five user interfaces) are being used to determine the feature vector that represents the cluster and three of the feature vectors include the encoding for a given feature, the feature vector for the cluster would include a value of 0.6 for the feature (i.e., (1+1+1+0+0)/5). The clustering engine 252 can perform this calculation for each feature found in at least one of the feature vectors to obtain the feature vector that represents the cluster.

In some implementations, the clustering engine 252 uses less than all of the user interfaces for the events assigned to the cluster to determine the user interface structure for the cluster. In one example, the clustering engine 252 can use the structure of up to a maximum number of user interfaces to determine the user interface structure for a cluster. In another example, the clustering engine 252 uses the structure of user interfaces that were assigned to the cluster (and/or received by the event processing apparatus 206) within a specified period of time (e.g., within the last day, two days, etc.). The clustering engine 252 can limit the user interfaces used to determine the user interface structure for a cluster based on both a maximum number of user interfaces and a specified time period.

As new events are assigned to clusters and user interfaces for the new events may be different from the user interface structure for the clusters to which the events are assigned, the clustering engine 252 can update the user interface structure for the clusters over time. For example, the clustering engine 252 can update the user interface structure for a cluster in response to a specified number (e.g., one, ten, etc.) of events being assigned to the cluster. In another example, the clustering engine 252 can update the user interface structure for a cluster periodically based on a specified period of time.

In some implementations, the clustering engine 252 samples events assigned to the cluster and uses the user interface structures for the sampled events to update the user interface structure for the cluster. For example, the clustering engine 252 may sample the events based on a specified frequency, such as every tenth event, every twentieth event, or based on another appropriate frequency. This allows for reduced user interface structure computations, which can reduce the computation burden of the event processing apparatus 206 and speed up the processing of events by the event processing apparatus 206. This also reduces the amount of memory needed to store the data used to determine the user interface structure for each cluster, freeing up memory for other purposes. For example, some publishers may send, to the evaluation apparatus 150, event data for thousands of events per minute. Using the data for each of these events to update the user interface structure for each cluster and storing the data (e.g., feature vectors) for each of the events would require substantially more computing resources than would be used if the events were sampled.

The effect of a given user interface in determining the user interface structure for a cluster can decay (e.g., be reduced) over time. As discussed above, the user interface structure for a cluster can be values for a set of features determined using a weighted average of the values for the features of the user interfaces for events assigned to the cluster. For example, the value of a feature for the user interface structure can be a weighted average of values of one for user interfaces assigned to the cluster that have the feature and values of zero for user interfaces assigned to the cluster that do not have the feature. The weight given to features of a particular user interface can decay over time so that the features of the user interface have less effect on the values for the set of features that represent the cluster over time. For example, the weights may decay exponentially over time. In this way, the user interface structure that represents each cluster can adapt as new events with different user interfaces are assigned to the clusters. These clustering techniques allow for a fast and scalable way to cluster events as the data for the events are received.

The clustering engine 252 can assign an event to a cluster based on a similarity between the structure of the user interface for the event and the user interface structure for the cluster. For example, the clustering engine 252 can compare values for a set of features for the structure of the user interface for the event to the values for the set of features for each cluster. Based on the comparisons, the clustering engine 252 can determine, for each cluster, a similarity score that represents the similarity between the set of features of the event's user interface and the set of features for the cluster. As described below, the clustering engine 252 can determine the similarity score for two sets of features using cosine similarity and computing the dot product of the two feature vectors that specify the two sets of features. The clustering engine 252 can use other similarity techniques, such as Euclidean distance or Jaccard similarity.

The clustering engine 252 can assign the event to the cluster having the highest similarity score. In some implementations, the clustering engine 252 compares the highest similarity score to a threshold similarity score before assigning the clustering engine 252 to a cluster. If the highest similarity score meets (e.g., equals or exceeds) the threshold similarity score, the clustering engine 252 assigns the event to the cluster that has the highest similarity score for the event.

If the highest similarity score does not meet the threshold similarity score, the clustering engine 252 creates a new cluster for the event and assigns the new cluster a new unique cluster identifier. For example, the fact that the highest similarity score does not meet the threshold similarity score may indicate that the structure of the user interface for the event data is not similar to the structures of the user interfaces already assigned to the clusters and therefore does not belong in any of the clusters. Using such a threshold similarity score allows the clustering to evolve to new or modified user interfaces of a publisher without user input.

The clustering engine 252 can also use the structure of the user interface for the event for which the cluster was created as the user interface structure for the cluster, e.g., until one or more additional events are assigned to the newly created cluster. After creating the cluster, the structure of user interfaces specified by event data (e.g., event data received after the cluster is created) can be compared to the user interface structure of the created cluster, e.g., by comparing feature vectors the represent the structure of the user interfaces. If received event data is assigned to the created cluster, e.g., based on a similarity score for the structure specified by the event data and the user interface structure of the created cluster, the clustering engine 252 can update the user interface structure for the created cluster based on the user interface structure specified by the event data, as described above.

At this point the user interface structure for the created cluster would be based on the structure of the user interface for which the cluster was created and the structure of the user interface specified by the event data assigned to the created cluster. For example, the user interface structure for the cluster can be represented by a feature vector that includes, for each feature that is found in at least one of the two user interfaces, a value for the feature. The value for each feature can be based on a weighted average for the feature. For example, if both user interfaces are given the same weight, the value for a feature may be one if both user interfaces have the feature, a value of 0.5 if one but not both user interfaces include the feature, and a value of zero if neither user interface includes the feature.

The values may be different if the values for the features are weighted based on the time the event data was received. For example, the values for the user interface for which the cluster was created may be given a weight of 0.4 and the values for the user interface of the event data assigned to the cluster may be given a weight of 0.6 as the event data assigned to the cluster was received more recently than the event data for the user interface for which the cluster was created. In this example, if the user interface for which the cluster was created includes a given feature and the user interface for the event data assigned to the cluster does not include the feature, the value for the feature would be 0.4 ((0.4*1)+(0.6*0)) in the feature vector that represents the user interface for the cluster. As new event data is assigned to the cluster, the feature vector that represents the user interface for the cluster can be updated in a similar manner, e.g., using the values for the features of at least a portion of the user interfaces previously assigned to the cluster and the values for the features of the user interface specified by the new event data.

The clustering engine 252 can automatically adjust the similarity score threshold to manage the number of clusters that are created. Initially, the clustering engine 252 can use a high similarity score threshold so that it is more likely that a new cluster will be created for newly received event data. Over time, the clustering engine 252 can reduce the similarity score threshold so that it becomes less likely that a new cluster will be created for newly received event data. For example, the clustering engine 252 can reduce the similarity score threshold based on the number of clusters created for a publisher. In a particular example, the clustering engine 252 can adjust the similarity score threshold for a publisher inversely proportional to the number of clusters created for the publisher's user interfaces. Thus, the clustering engine 252 can automatically manage the number of clusters that exist so as to balance the tradeoffs between the number of clusters maintained and ensuring that each cluster includes a sufficient number of members.

The event processing apparatus 206 also includes a grouping engine 254 (which may be implemented in a back-end server) that groups clusters into user interface state groups. Each user interface state group represents a user interface state. For example, each user interface state group can represent a logical user interface state for a user interface that presents the same (or similar) type(s) of data for different entities (e.g., different users, products, locations, objects, etc.).

The grouping engine 206 can group clusters based on a user interface attribute (e.g., URL pattern or titles of user interfaces), based on variations of user interface structure that have a common or similar pattern, based on the occurrence of a same event or type of event (e.g., add image event), and/or other appropriate characteristics. For example, the grouping engine 206 can generate a user interface state group for two or more clusters for which at least a portion of the member events have a same user interface attribute.

In some implementations, the grouping engine 254 learns a general pattern, e.g., a general URL pattern, for each cluster. The grouping engine 254 can then generate a user interface state group that includes each cluster that have the same (or similar pattern). For example, after learning the patterns, the grouping engine 254 can determine a measure of similarity between the patterns (e.g., between pairs of patterns) and assign patterns that have at least a threshold measure of similarity to a same user interface state group. For URL patterns, the measure of similarity between two patterns can be an edit distance between the characters of the two patterns.

The grouping engine 254 can learn a pattern of user interface attributes for a cluster based on commonalities and differences between the user interface attributes of the user interfaces for the events assigned to the cluster. In some implementations, the grouping engine 254 determines, by aligning and comparing pairs of user interface attributes, which components of the user interface attributes are well represented in the user interface attributes and which components are not well represented. For example, the grouping engine 254 can determine which components meet a condition and which components do not meet the condition. The condition can represent a statistical significance within the set of events. For example, the condition can be a threshold percentage. In this example, the general user interface attribute for a cluster can include the components for which at least a threshold percentage of the user interface attributes in the cluster include the components. The general user interface attribute can include a wildcard or a set of potential values for the components for which less than the threshold percentage of the user interface attributes in the cluster include the components.

In a particular example, the general user interface attribute for a cluster can be a URL pattern. To determine the URL pattern for a cluster, the grouping engine 254 can align pairs of URLs specified by the event data for the events assigned to the cluster. For each pair, the grouping engine 254 can identify which components match and which components do not match. For example, a pair of URLs can include "example.com/product_page/product_A" and "example.com/product_page/product_B. If a given component is found in many (e.g., at least a statistically significant amount) of the URLs in the cluster, the URL pattern for the cluster can include the component. Continuing the previous example, if many of the URLs include "example.com/product_page/" but the component of the URLs that follow "product_page/" are different, the grouping engine 254 can determine that the URL pattern should be "example.com/product_page/*" where "*" is a wildcard.

The grouping engine 254 can also evaluate the components that differ between the pairs of URLs to determine whether a wild card should represent those components or if a set of values should represent those components. The grouping engine 254 can consider the number of different values for the components and the relative frequency of each component. If the value of the component is spread over many different values (e.g., greater than a threshold number of values), the grouping engine 254 can use a wildcard for the component.

If the value of the component is spread over a few different values (e.g., fewer than a threshold number of values), the grouping engine 254 can use a set of the few values. Continuing with the previous example, if the components following "example.com/product_page" is always either "product_A" or "product_B", the grouping engine 254 can determine that the URL pattern should be "example.com/product_page/(product_A or product_B)". If there are few values, but some have a much higher frequency of occurrence than others (e.g., at least a threshold greater frequency of occurrence), the grouping engine 254 can include, in the set of values, the values of the component with the much higher frequencies of occurrence.

The grouping engine 254 can update the user interface state groups, e.g., periodically based on a specified time period or in response to new clusters being generated. For example, a new cluster may be assigned a general user interface attribute that matches the general user interface attribute for an existing group. Updating the user interface state groups allows the aggregate statistics and other data for the user interface states to be up to date and include the data for all events that are related to the user interface state.

The grouping engine 254 can generate a table 244 (or other data structure) that specifies, for each user interface state group, the clusters that are assigned to the group. The table 244 can also specify, for each user interface state group, the events assigned to the group based on the events being assigned to clusters in the user interface state group.

The event processing apparatus 206 also includes a search system 256 that retrieves, aggregates, and provides data related to events, clusters of event data, and/or user interface state groups in response to requests. The search system 256 can use the tables 242 and 244 (or other data structures that include similar event data) to provide the data. For example, the tables 242 and 244 can be part of a search index used by the search system 256 to provide data related to events, clusters of event data, and user interface state groups.

Using the clusters and user interface state groups, the search system 256 can provide data related to user interface states, e.g., logical user interface states. For example, a publisher of a social networking site may want to know how users are finding their way to a help page, which may be a logical user interface state of the social networking site. In this example, the publisher of the social networking site can submit a query that specifies "transitions to help page." The user could also select a link for the "help page" on a dashboard for the publisher and then a link to transition data. Either way, the search system 256 can identify the user interface state group that corresponds to the help page. The search system 256 can use the table 244 to identify the events that are assigned to the group. As each event includes a timestamp, the search system 256 can identify, for each event, the event that immediately preceded the event and the user interface state to which the preceding event was assigned. The search system 256 can determine, for each of these user interface state groups, a number of the preceding events that were assigned to the user interface state group. This number for each user interface state group represents the number of times a user transitioned from the user interface states represented by the group to the "help page."

Another example query may be the number of different user interface structures for a user interface state. The search system 256 can determine this number by identifying the number of clusters assigned to the user interface state group that represents the user interface state. For example, group 0 of table 244 includes three clusters. If the search system 256 receives a query that specifies the user interface attribute for group 0, the search system 256 can use table 244 to determine that there are three clusters, and thus, three different user interfaces structures for the user interface state corresponding to the user interface attribute.

The search system 256 can also show the most common structural configurations of each user interface state. For example, a social networking site publisher may want to know the most common structural configurations of the news feed page. In this example, the search system 256 can identify the user interface state group for the news feed page and then identify the cluster to which the most events are assigned. If the most common structural configuration is a broken state, a publisher would want to know this so that the publisher can determine why or how users are arriving at the broken state and fix any errors or improve the user interface(s) to prevent users from transitioning to the broken state.

Another example query is the frequency of occurrence of each structure for a user interface state. The search system 256 can use the table 244 to identify the different clusters for the user interface state group that represents the user interface state. The search system 256 can also identify, for each cluster, the number of events assigned to each cluster. This number of events for a cluster represents the frequency of occurrence of the structure represented by the cluster.

Another example query may be the number of users from a particular geographic location for which a user interface state was presented using a particular structure. The search system 256 can use the table 244 to identify the events that are assigned to the user interface state group that represents the user interface state. The search system 256 can also use the contextual data for these identified events to identify a subset of the events that occurred for user devices located in the geographic location. The search system 256 can then count the number of the events in the subset that were assigned to the cluster that represents the queried structure.

Another example query may be a frequency of each unique URL for a user interface state. For example, as described above, the URL for a logical user interface state may differ based on the entity for which the user interface is being presented. The search system 256 can use the table 244 to identify each event assigned to the user interface state group that represents the user interface state group. The search system 256 can also identify the URL specified by the event data for each of the identified events. The search system 256 can count the number of times each unique URL occurs in the event data for the identified events.

The number and/or distribution of URLs for a structural configuration can reveal information about how users are arriving at that structural configuration of a user interface state. For example, a structural configuration of a user interface state may be an error page, such as a 404 page that indicates that a resource cannot be found. In this example, there may be broken links that point to the wrong domain. By being able to identify a preceding event and its user interface state, the search system 256 can provide data specifying the user interface states from which users have transitioned to the error page. These user interface states may include a broken link. Similarly, using the distribution or URLs, a publisher or the search system 256 can determine that users are manually entering an incorrect domain or sub-domain, e.g., domains or sub-domains that have a high rate of occurrence in a cluster that represents the error page.

In some implementations, the search system 256 provides suggestions to publishers. For example, the search system 256 can identify and suggest user interface state groups and/or structures in user interface state groups that lead to errors or error pages. In this example, the search system 256 can identify the various structures for a user interface state group. If one of the clusters represents the structure of the user interface when an error condition is present, the search system 256 can identify the event data assigned to the cluster that represents the structure for the error condition. The search system 256 can then identify the user interface state groups and/or the clusters from which users transitioned to the user interfaces having the error condition. The search system 256 can then suggest that the user interface states or structures for which a statistically significant number of transitions to the user interfaces having the error condition occurred are leading to errors. For example, the search system 256 can suggest user interface states or structures for which the number of occurrences meets a threshold and/or for which the number of occurrences exceeds the number of occurrences of other user interface states or structures by at least a threshold amount.

Figure 3:
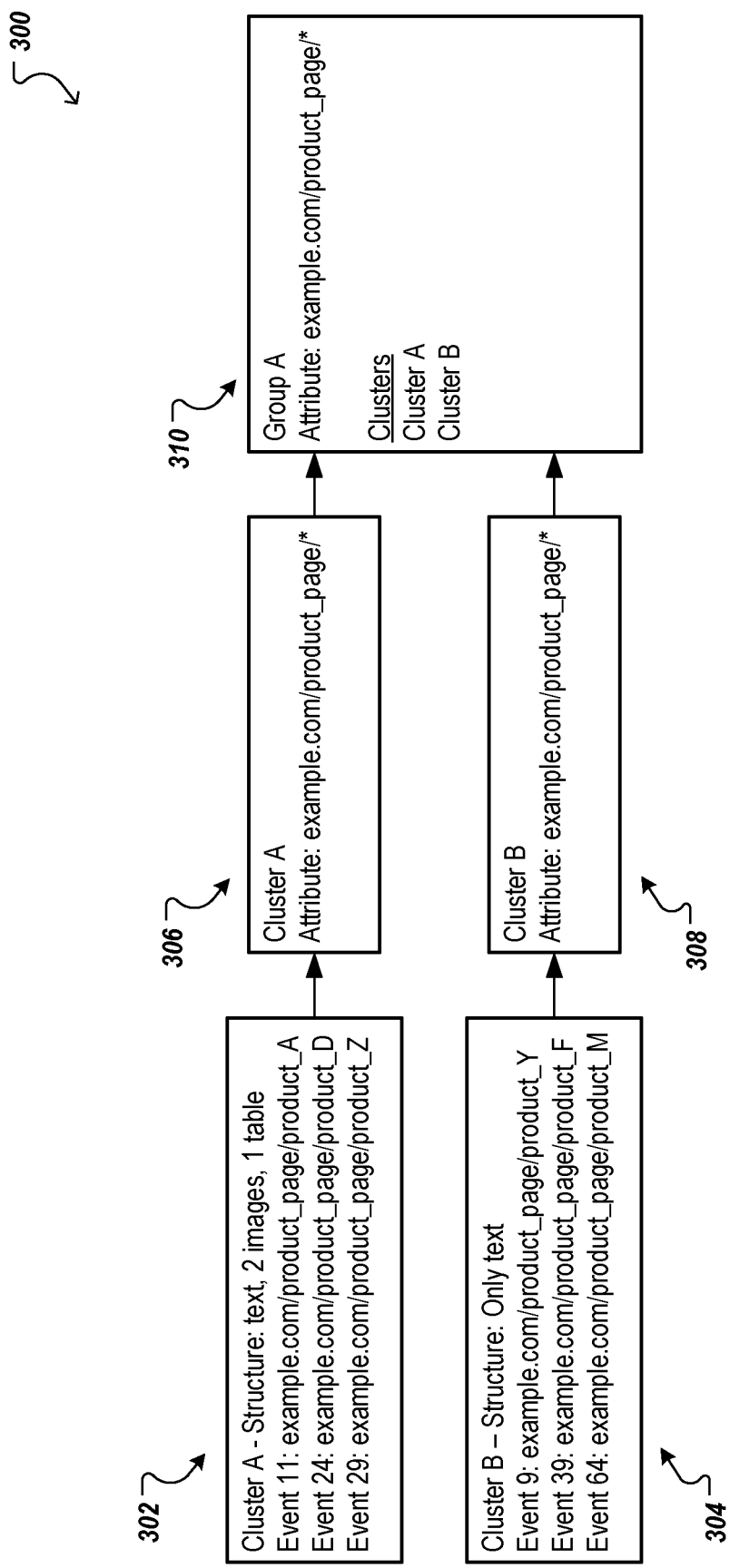
FIG. 3 is another example data flow for grouping clusters of event data for user interface events.

FIG. 3 is another example data flow 300 for grouping clusters of event data for user interface events. In this example, a first cluster of events, Cluster A 302, includes three events for which the user interface at the time of the event have the same structure, i.e., text, 2 images, and 1 table. A second cluster of events, Cluster B 304 includes three events for which the user interface at the time of the event has the same structure, i.e., only text.

The event data of each event of the Cluster A 302 includes a URL component "example.com/product_page/". However, the components of each URL that follows this component differ. Thus, a grouping engine, e.g., the grouping engine 254 of FIG. 2, has determined a general URL pattern of "example.com/product_page/*" for the Cluster A as shown in block 306. In another example, the grouping engine may have determined a URL pattern of "example.com/product_page/(A or D or Z)" for the Cluster A.

Similarly, the event data of each event of the Cluster B 304 includes a URL component "example.com/product_page/". However, the components of each URL that follows this component differ. Thus, a grouping engine, e.g., the grouping engine 254 of FIG. 2, has determined a general URL pattern of "example.com/product_page/*" for the Cluster B as shown in block 308. In another example, the grouping engine may have determined a URL pattern of "example.com/product_page/(Y or F or M)" for the Cluster B.

As the general URL patterns of both clusters are the same, the grouping engine can assign both clusters to the same user interface state group, Group A 310. This user interface state group can represent the logical user interface state group for a product detail page. The structure of the product detail page may differ based on the type of product. For example, products A, D, and Z may be products for which an image is helpful for a user viewing the product, while images for products Y, F, and M may not be useful. Thus, the structures of the different product detail pages are different. However, the URLs are similar, except for the component that specifies the actual product for which the product detail page is being presented.

Figure 4:
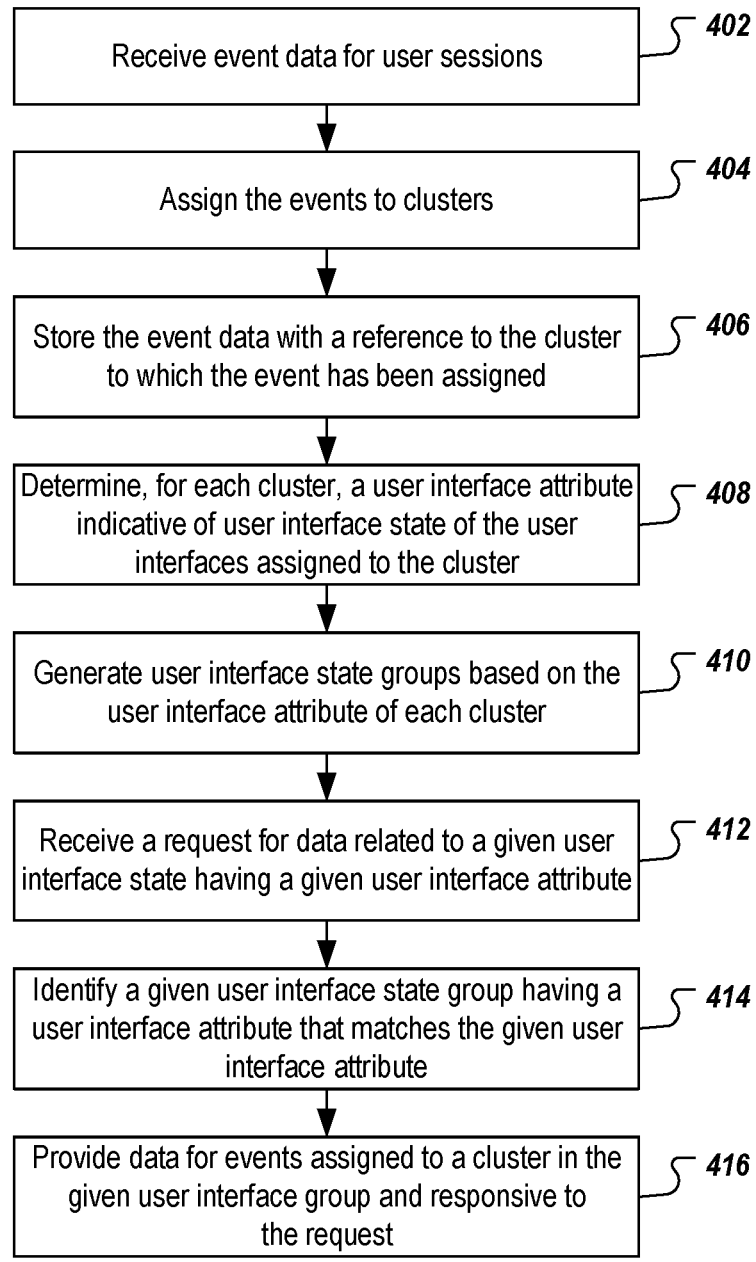
FIG. 4 is a flow chart of an example process for providing event data in response to a request.

FIG. 4 is a flow chart of an example process 400 for providing event data in response to a request. Operations of the process can be performed, for example, by one or more data processing apparatus, such as the evaluation apparatus 150 and/or the event processing apparatus 206. Operations of the process 400 can also be implemented as instructions stored on a non-transitory computer readable medium. Execution of the instructions cause one or more data processing apparatus to perform operations of the process 400.

Event data for user sessions are received (402). The event data for a user session can include data for one or more user interface events that occurred at a user interface of a publisher. The event data for each event can specify the structure of the user interface at the time or the event or data that can be used to reconstitute the structure of the user interface, as discussed above. The event data can also include contextual data, such as the geographic location of a user device at the time the event occurred.

The events are assigned to clusters (404). In some implementations, the events are assigned to clusters based on the structure of the user interface for each event. For example, as discussed above, the structure of the user interface for an event can be compared to a user interface structure for each existing cluster. Based on the comparison of the structure of the user interface for an event and the user interface structure for an existing cluster, a similarity score can be determined that represents the similarity between the two structures. If the highest similarity score for an event meets a threshold, the event can be assigned to the cluster for which the highest similarity score was determined. If not, a new cluster can be created and the event can be assigned to the new cluster. The structure of the user interface for the event can be the user interface structure for the new cluster.

The event data is stored with a reference to the cluster to which the event has been assigned (406). For example, each cluster can have a unique identifier and each event can have a unique identifier. The event and its data can be stored with a reference to the unique cluster identifier for the cluster to which the event has been assigned.

A user interface attribute is determined for each cluster (408). The user interface attribute for a cluster can be indicative of a user interface state of user interfaces specified by the event data in the cluster. For example, as discussed above, the user interface attribute for a cluster can be a general URL pattern generated based on the URLs specified by the event data in the cluster.

User interface state groups are generated based on the user interface attribute of each cluster (410). Each user interface state group can include clusters for which the user interface attribute is the same or similar. For example, if the user interface attribute of each cluster is a general URL pattern, a user interface state group can include two or more clusters for which the general URL have less than a threshold edit distance.

A request is received for data related to a given user interface state having a given user interface attribute (412). For example, the request can specify a URL component, page title, or other user interface attribute used to group the clusters. The request can also specify the type of data requested, e.g., a distribution of URLs for the given user interface state, a distribution of different structures for the given user interface state, transitions to or from the given user interface state, and/or other appropriate data related to the given user interface state.

A given user interface state group that has a user interface attribute that matches the given user interface attribute is identified (414). A user interface attribute of a user interface state group can match the given user interface attribute by including the given user interface attribute. For example, the user interface attribute for a product detail page may be "example.com/product_page/*". In this example, if the given user interface attribute is "product_page", there would be a match as "product_page" is included in "example.com/product_page/*".

Data for events assigned to a cluster in the given user interface group and responsive to the request are provided (416). For example, if the request was for an aggregated statistic, such as a distribution of URLs for the given user interface state, the URLs for each event assigned to a cluster that has been assigned to the given user interface groups can be used to determine the URL distribution. Similarly, if the request was for a distribution of different structures for the given user interface state, the structure of each cluster assigned to the given user interface state group can be used to determine the distribution of different structures.

Figure 5:
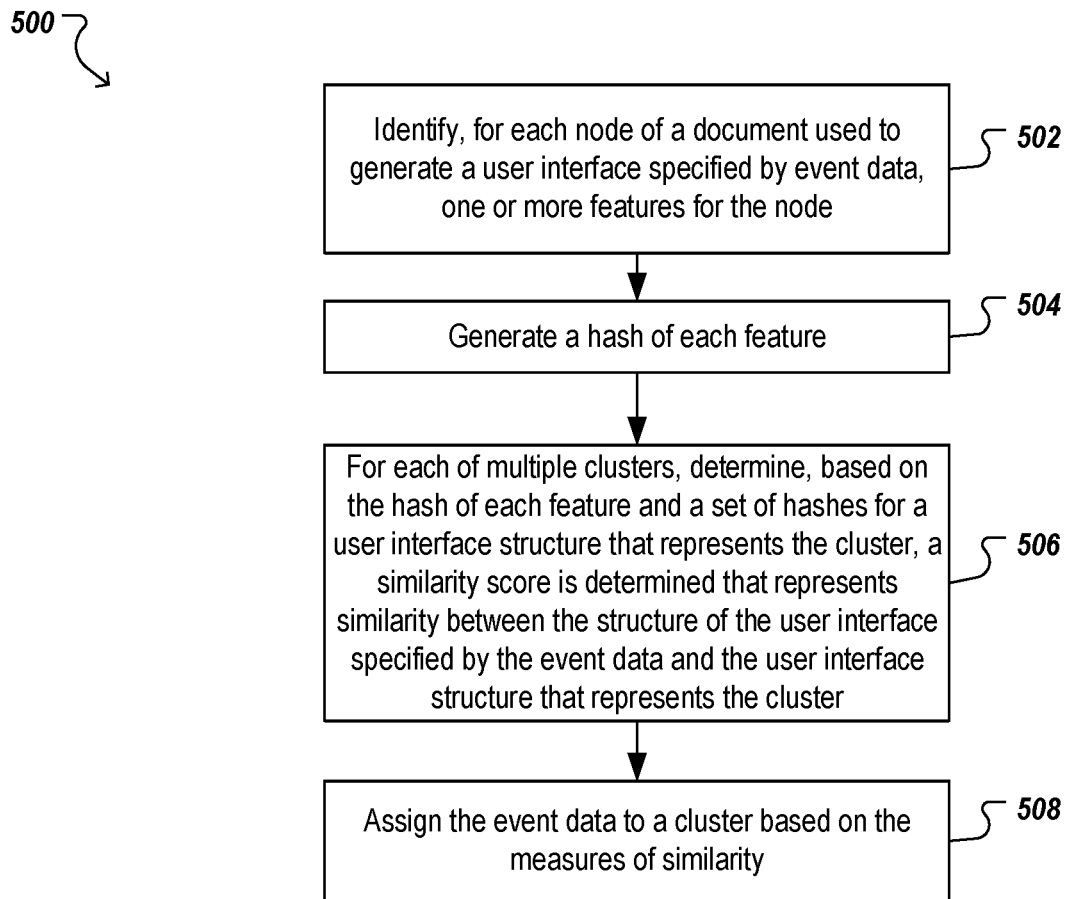
FIG. 5 is a flow chart of an example process for assigning event data to a cluster.

FIG. 5 is a flow chart of an example process 500 for assigning event data to a cluster. Operations of the process can be performed, for example, by one or more data processing apparatus, such as the evaluation apparatus 150 and/or the event processing apparatus 206. Operations of the process 500 can also be implemented as instructions stored on a non-transitory computer readable medium. Execution of the instructions cause one or more data processing apparatus to perform operations of the process 500.

Figure 6:
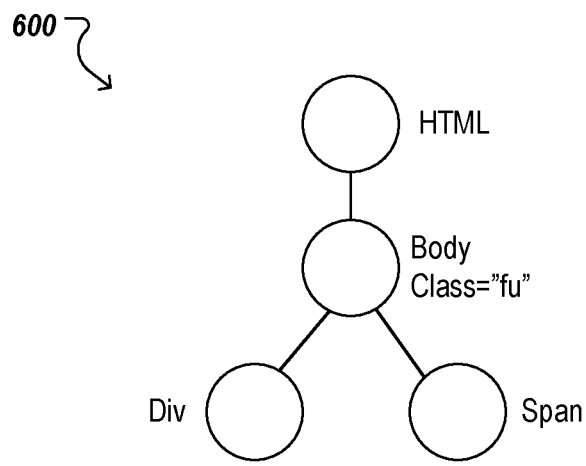
FIG. 6 depicts a tree structure of an example document model object (DOM).

The process 500 is described with reference to FIG. 6, which depicts a tree structure of an example document model object (DOM) 600 for a document. The process 500 generates encodings of user interface structural features in the form of a set of hashes and compares the set of hashes (or values representing the set of hashes) to determine the similarity between the user interface structures.

For each node of a document used to generate a user interface specified by event data, one or more features of the node are identified (502). The features can be identified so that the features represent patterns of node structure in the user interfaces. For example, the DOM for many different documents from which user interfaces are generated may include the same nodes and tags, but in different arrangements. By encoding features that represents patterns or arrangements of nodes, the accuracy in determining the similarity between user interfaces structures can be improved.

In some implementations, the features for a given node can include one or more features of the given node itself and/or one or more features of other nodes that are related to, or connected to, the given node. For example, the features for the given node can include features of ancestor nodes, e.g., that are identified using a walk-up of a tree structure. In the walk up of the tree structure, a set of one or more features for the lowest node(s) in the tree is identified. For example, the lowest nodes in the tree structure of the DOM 600 are the nodes for "Div" and "Span". Then, the process moves up the tree one node at a time to identify a set of one or more features of each node until a set of one or more features for the top node is identified.

In some implementations, the features for a node include features related to nodes that are above the node in the tree (e.g., one or more parent and/or grandparent nodes). For example, the features for a given node can include one or more features of the given node and one or more features of the given node's parent node and one or more features of the parent node's parent node (i.e., the given node's grandparent node). In this way, the set of features for a user interface represent patterns of nodes in the structure used to generate the user interface.

In a particular example, the features of a given node can include text strings based on the tags (e.g., HTML tags) of the node and text strings based on tags of one or more parent and/or grandparent nodes. For example, the features for the node "Div" can include the string "Body Div" which represents the tag of the node and the tag of the parent node. The features for the node "Div" can also include the string "HTML Body Div" which represents the tag of the node "Div", the tag of its parent node "Body", and the tag of its grandparent node "HTML". The features for the node can also include the string "HTML Body.fu Div" which represents the tag of the node "Div", the tag of its parent node "Body", and the class name of the node's parent node.

The process 500 can walk up the tree structure to the node "Body". As the node "Body" only has a parent node "HTML" and no grandparent nodes, the number of features for the node "Body" can be fewer than the number of features for the node "Div". In this example, the set of features for the node "Body" can include the string "HTML Body" which represents the tag for the node "Body" and the tag of its parent node "HTML". The set of features for the node "Body" can also include the string "HTML Body.fu" which represents the class of the node "Body" and the tag of its parent node "HTML".

The process 500 can walk up the tree structure to the node "HTML". As the node "HTML" does not have any parent or grandparent nodes, the number of features for the node "HTML" can be fewer than the number of features for lower nodes. In this example, the set of features for the node "HTML" can include the string "HTML" which represents the node "HTML". In this way, the set of features that represents a user interface can include a pattern of how the nodes are arranged in the tree structure.

The features of the example nodes of the DOM 600 are provided as examples only. Other features of the nodes and/or the nodes for which features are identified for each given node can also be used. For example, the feature for a node can include whether or not the node includes an attribute, e.g., independent of the actual value of the attribute. The features for a node can also include features related to the visual representation of the user interface element, e.g., the element's dimensions, color, shape, etc.

A hash of each feature is generated (504). For example, a hash function can be used to determine a hash of each feature for each node. The hashes can be included in a vector of hashes that represents the structure of the user interface specified by the event data.

For each of multiple clusters, a similarity score is determined that represents the similarity between the structure of the user interface specified by the event data and the user interface structure that represents the cluster (506). In some implementations, the similarity score for the user interface structure specified by the event data and the cluster can be based on a comparison of the hashes determined for the user interface structure specified by the event data and a corresponding set of hashes generated for the user interface structure that represents the cluster. For example, the similarity score can be equal to, or directly proportional to a number of matching hashes between the two sets of hashes.

In some implementations, the similarity score is based on a feature vector that includes values based on the user interface structure specified by the event data and a feature vector that includes values based on the user interface structure that represents the cluster. For example, the feature vector for the user interface structure specified by the event data can include a value of one for each feature included in the user interface structure specified by the event data and a value of zero for each feature that is not included in the user interface structure specified by the event data. Similarly, the feature vector for the cluster can include, for each feature, a weighted average of the value for the feature in each feature vector used to determine the feature vector for the cluster, as discussed above. In this example, the value for each feature would be between zero and one inclusive depending on the number of user interfaces for event data assigned to the cluster and the weight assigned to each event. The similarity score in this example can be based on the cosine similarity between the two feature vectors.

The event data is assigned to a cluster based on the similarity scores (508). For example, the event data can be assigned to the cluster for which the similarity score is the highest. In another example, the event data can be assigned to the cluster for which the similarity score is the highest only if the similarity score meets a threshold similarity score. Otherwise, a new cluster is generated for the event data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a data store; and
one or more computers that interact with the data store and execute instructions that cause the one or more computers to perform operations comprising:
for each of a plurality of different user sessions:
receiving, for a user interface event, event data specifying a structure of a user interface presented during the user session;
assigning the event to a respective cluster based on a comparison of the structure of the user interface specified by the event data to a user interface structure that represents the respective cluster; and
storing the event data with a reference to the cluster to which the event has been assigned;
determining, for each cluster, a user interface attribute indicative of a user interface state of user interfaces specified by the event data in the cluster;
generating a plurality of user interface state groups based on the user interface attribute for each cluster, wherein each user interface state group includes clusters that have a matching user interface attribute;
receiving, from a requesting device, a request for data related to a given user interface state having a given user interface attribute;
identifying a given user interface state group for which the matching user interface attribute matches the given user interface attribute; and
in response to the received request, providing, to the requesting device, data for events that are (i) assigned to a cluster in the given user interface state group and (ii) responsive to the request.

2. The system of claim 1, wherein generating the plurality of user interface state groups comprises:
identifying, for each pair of clusters, a measure of similarity between the user interface attributes for the pair of clusters; and
assigning pairs of clusters for which the measure of similarity satisfies a threshold to a same user interface state group.

3. The system of claim 1, wherein the user interface attribute for each cluster comprises a Universal Resource Locator (URL) pattern generated based on a respective URL for the user interface of each event assigned to the group.

4. The system of claim 3, wherein the operations comprise generating the URL for each cluster by:
identifying, for the cluster, one or more first URL portions for which a number of URLs of the events assigned to the cluster that include the first URL portion satisfies a condition;
identifying, for the cluster, one or more second URL portions for which a number of URLs of the events assigned to the cluster that include the second URL portion does not satisfy the condition; and
generating the URL pattern for the cluster by including, in the URL pattern for the cluster, each of the one or more first URL portions and at least one of (i) a wildcard for each of the one or more second URL portions or (ii) a set of values that include at least a portion of the second URL portion of one or more of the second URL portions.

5. The system of claim 1, wherein the user interface attribute for each cluster comprises a title for the cluster that is generated for the cluster based on a respective title for the user interface of each event assigned to the cluster.

6. The system of claim 1, wherein assigning the event to a respective cluster based on a comparison of the structure of the user interface specified by the event data to a user interface structure that represents the respective cluster comprises:
identifying, for each node of a document used to generate the user interface specified by the event data, one or more features of the node;
generating a hash of each feature for each node;
for each of a plurality of clusters:
determining, based on the hash for each feature of each node and a set of hashes for the user interface structure that represents the cluster, a similarity score that represents a similarity between the structure of the user interface specified by the event data and the user interface structure that represents the cluster; and
assigning the event data to the respective cluster in response to the similarity score for the respective cluster being greater than the similarity score for each other cluster.

7. The system of claim 1, wherein assigning the event to a respective cluster based on a comparison of the structure of the user interface specified by the event data to a user interface structure that represents the respective cluster comprises:
determining, for each existing cluster, a similarity score that represents a measure of similarity between the structure of the user interface specified by the event data and the existing cluster;
determining that none of the similarity scores meet a threshold similarity score; and
in response to determining that none of the similarity scores meet the threshold similarity score, generating the respective cluster for the event data.

8. The system of claim 7, wherein the operations comprise adjusting the threshold similarity score with an increase in a number of existing clusters.

9. The system of claim 1, wherein the provided event data includes at least one of (i) data identifying one or more user interface states from which a transition to user interfaces having the given user interface attribute occurred or (ii) data identifying one or more user interface states to which a transition from user interfaces having the given user interface state attribute occurred.

10. The system of claim 1, wherein the request specifies a frequency of URLs and the provided event data comprises a frequency of each URL included in the event data assigned to the clusters in the given user interface state group.

11. A method comprising:
for each of a plurality of different user sessions:
receiving, for a user interface event, event data specifying a structure of a user interface presented during the user session;
assigning the event to a respective cluster based on a comparison of the structure of the user interface specified by the event data to a user interface structure that represents the respective cluster; and storing the event data with a reference to the cluster to which the event has been assigned;

determining, for each cluster, a user interface attribute indicative of a user interface state of user interfaces specified by the event data in the cluster;

generating a plurality of user interface state groups based on the user interface attribute for each cluster, wherein each user interface state group includes clusters that have a matching user interface attribute;

receiving, from a requesting device, a request for data related to a given user interface state having a given user interface attribute;

identifying a given user interface state group for which the matching user interface attribute matches the given user interface attribute; and in response to the received request, providing, to the requesting device, data for events that are (i) assigned to a cluster in the given user interface state group and (ii) responsive to the request.

12. The method of claim 11, wherein generating the plurality of user interface state groups comprises:

identifying, for each pair of clusters, a measure of similarity between the user interface attributes for the pair of clusters; and assigning pairs of clusters for which the measure of similarity satisfies a threshold to a same user interface state group.

13. The method of claim 11, wherein the user interface attribute for each cluster comprises a Universal Resource Locator (URL) pattern generated based on a respective URL for the user interface of each event assigned to the group.

14. The method of claim 13, further comprising generating the URL for each cluster by:

identifying, for the cluster, one or more first URL portions for which a number of URLs of the events assigned to the cluster that include the first URL portion satisfies a condition;

identifying, for the cluster, one or more second URL portions for which a number of URLs of the events assigned to the cluster that include the second URL portion does not satisfy the condition; and generating the URL pattern for the cluster by including, in the URL pattern for the cluster, each of the one or more first URL portions and at least one of (i) a wildcard for each of the one or more second URL portions or (ii) a set of values that include at least a portion of the second URL portion of one or more of the second URL portions.

15. The method of claim 11, wherein the user interface attribute for each cluster comprises a title for the cluster that is generated for the cluster based on a respective title for the user interface of each event assigned to the cluster.

16. The method of claim 11, wherein assigning the event to a respective cluster based on a comparison of the structure of the user interface specified by the event data to a user interface structure that represents the respective cluster comprises:

identifying, for each node of a document used to generate the user interface specified by the event data, one or more features of the node;

generating a hash of each feature for each node;

for each of a plurality of clusters:

determining, based on the hash for each feature of each node, a set of hashes for the user interface structure that represents the cluster, a similarity score that represents a similarity between the structure of the user interface specified by the event data and the user interface structure that represents the cluster; and assigning the event data to the respective cluster in response to the similarity score for the respective cluster being greater than the similarity score for each other cluster.

17. The method of claim 11, wherein assigning the event to a respective cluster based on a comparison of the structure of the user interface specified by the event data to a user interface structure that represents the respective cluster comprises:

determining, for each existing cluster, a similarity score that represents a measure of similarity between the structure of the user interface specified by the event data and the existing cluster;

determining that none of the similarity scores meet a threshold similarity score; and in response to determining that none of the similarity scores meet the threshold similarity score, generating the respective cluster for the event data.

18. The method of claim 17, further comprising adjusting the threshold similarity score with an increase in a number of existing clusters.

19. The method of claim 11, wherein the provided event data includes at least one of (i) data identifying one or more user interface states from which a transition to user interfaces having the given user interface attribute occurred or (ii) data identifying one or more user interface states to which a transition from user interfaces having the given user interface state attribute occurred.

20. A non-transitory computer readable medium storing instructions that upon execution by one or more computers cause the one or more computers to perform operations comprising:

for each of a plurality of different user sessions:

receiving, for a user interface event, event data specifying a structure of a user interface presented during the user session;

assigning the event to a respective cluster based on a comparison of the structure of the user interface specified by the event data to a user interface structure that represents the respective cluster; and storing the event data with a reference to the cluster to which the event has been assigned;

determining, for each cluster, a user interface attribute indicative of a user interface state of user interfaces specified by the event data in the cluster;

generating a plurality of user interface state groups based on the user interface attribute for each cluster, wherein each user interface state group includes clusters that have a matching user interface attribute;

receiving, from a requesting device, a request for data related to a given user interface state having a given user interface attribute;

identifying a given user interface state group for which the matching user interface attribute matches the given user interface attribute; and in response to the received request, providing, to the requesting device, data for events that are (i) assigned to a cluster in the given user interface state group and (ii) responsive to the request.

* * * * *